June 3, 1969     H. M. CANTERBURY     3,447,687
IN-LINE FILTER CASE
Filed Oct. 6, 1967     Sheet _1_ of 2
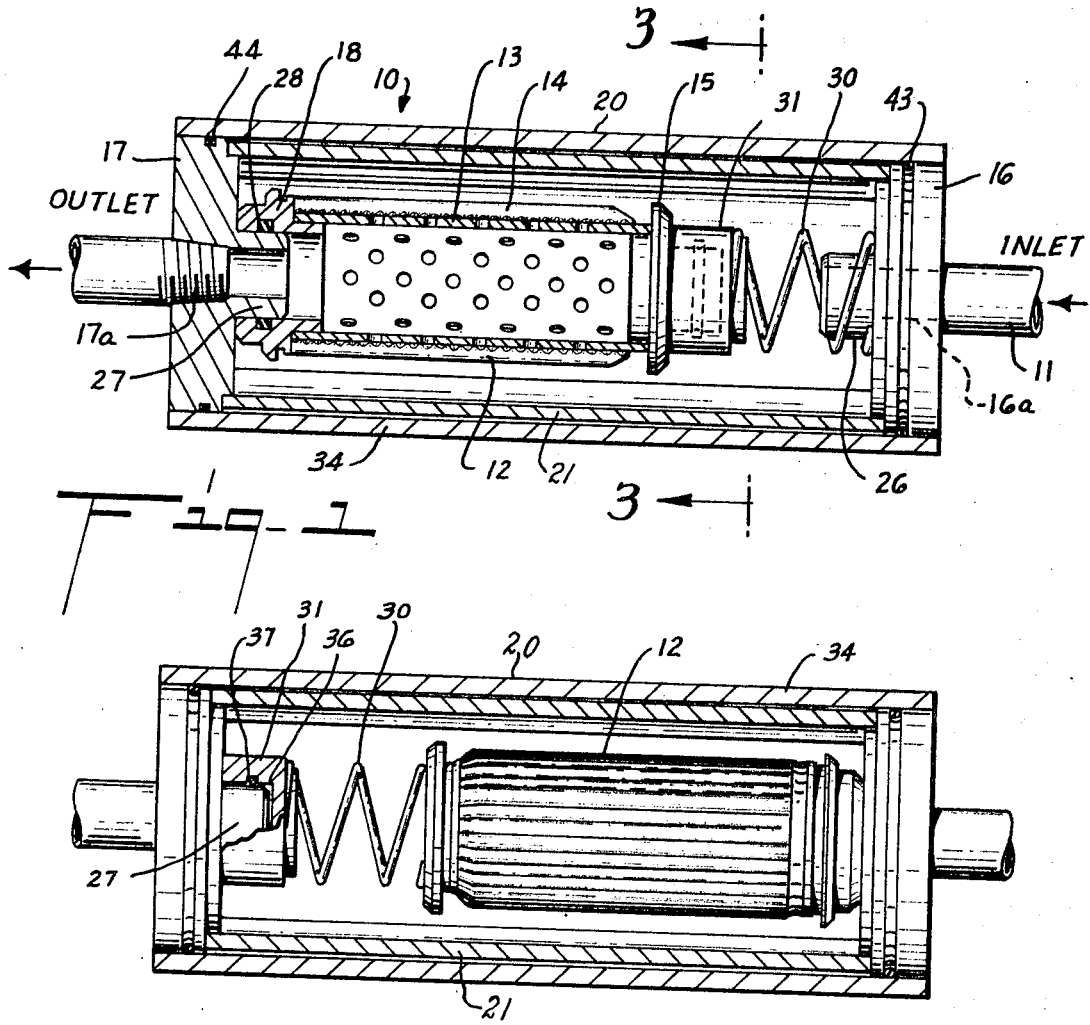
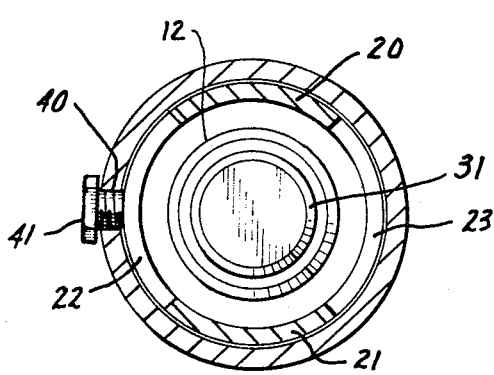
HOWARD M. CANTERBURY
INVENTOR.
BY
Browning, Simmons, Hyer & Eickenroht
ATTORNEYS

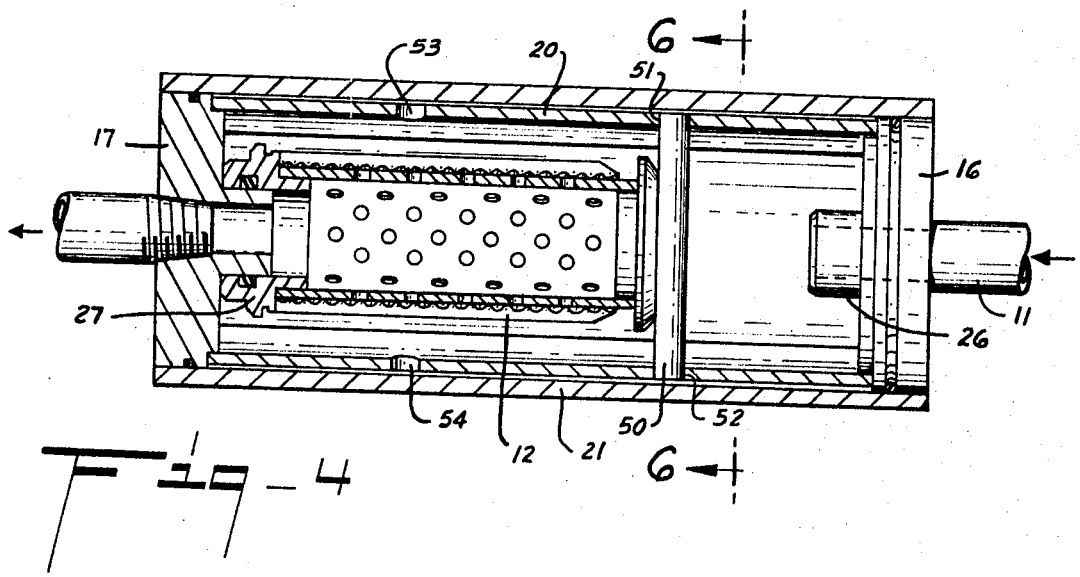
Fig. 4
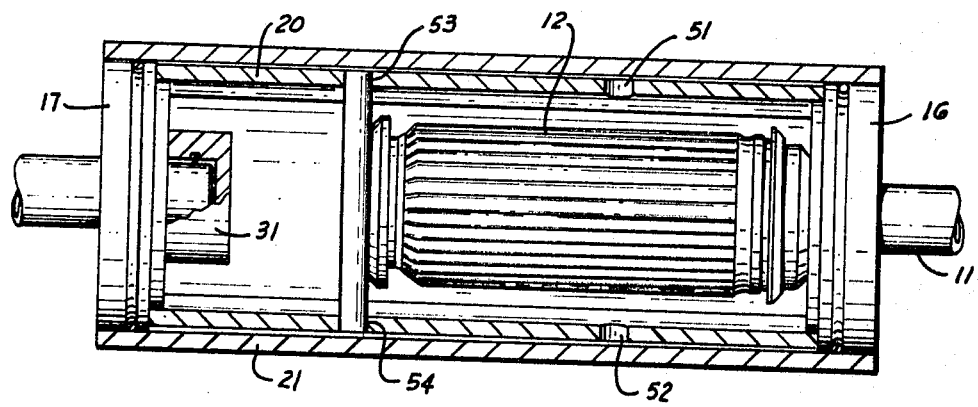
Fig. 5
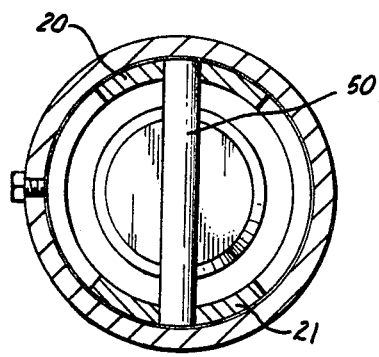
Fig. 6
Howard M. Canterbury
INVENTOR.
BY
ATTORNEYS

United States Patent Office 3,447,687
Patented June 3, 1969

3,447,687
IN-LINE FILTER CASE
Howard M. Canterbury, 6306 Schevers,
Houston, Tex. 77017
Continuation-in-part of application Ser. No. 636,892,
May 8, 1967. This application Oct. 6, 1967, Ser.
No. 673,339
Int. Cl. B01d 21/02, 35/00; C02c 1/26
U.S. Cl. 210—232                                 10 Claims

ABSTRACT OF THE DISCLOSURE

An in-line filter case comprising disc-shaped inlet and outlet members permanently connected in the flow line, two spacer bars connected between the members and a sleeve in sliding sealing engagement with said members and enclosing the space therebetween. A filter element releasably mounted in said case between said inlet and outlet members.

---

This is a continuation-in-part of patent application Ser. No. 636,892, filed May 8, 1967, now abandoned and entitled, "In-Line Filter Case."

This invention relates to in-line filter cases and, in particular, to in-line filter cases for replaceable filter elements.

Whenever it is necessary to change a filter element in a flow line, the flow of fluid through the line must be stopped and the pressure therein bled-off before the filter case can be opened. While this is taking place, and during the time the filter case is opened, the filter element removed, a new one installed, and the filter case reassembled, the process in which the flow line is connected is stopped. Any time a process or a portion thereof is stopped, the costs connected with operating the process or plant go up. In other words, for maximum efficiency any plant must be operated with a minimum of downtime. Thus, speed in changing filter elements in flow lines is very important.

The one thing that slows up changing filter elements more than anything else is the making and breaking of threaded connections. Usually, this requires tools and wrenches. In addition, wherever a threaded connection is broken and made up again, there is always the possibility that it will begin to leak, requiring further tightening or adjustment before the line can be placed back into service.

Therefore, it is an object of this invention to provide an in-line filter case for mounting a replaceable filter element that permits the filter element to be removed therefrom and replaced without having to connect or disconnect a threaded connection.

It is a further object of this invention to provide an in-line filter case that permits the filter element to be replaced without the use of tools or wrenches of any kind.

Many filter elements can be used over and over again by back-flushing them periodically to wash away the material that they have filtered out of the fluid and which is collected on the upstream side of the filter element.

It is still another object of this invention to provide an in-line filter case for a replaceable filter that permits a filter element to be back-flushed quickly and easily with the fluid from the line in which it is to be installed.

These and other objects, advantages, and features of this invention will be apparent to those skilled in the art from a consideration of this specification, attached drawings, and appended claims.

The invention will now be described in detail in connection with the attached drawings in which, FIGURE 1 is a vertical, cross-sectional view through one embodiment of the in-line filter of this invention installed in a flow line with a replaceable filter element positioned in the case to filter fluid flowing through the flow line;

FIGURE 2 is a view similar to FIGURE 1 with the filter element in position for back-flushing;

FIGURE 3 is a sectional view taken along line 3—3 of Figure 1;

FIGURE 4 is a vertical, cross sectional view through the preferred embodiment of the in-line filter of this invention installed in a flow line with a replaceable filter element positioned in the case to filter fluid flowing through the flow line;

FIGURE 5 is a view similar to FIGURE 4 with the filter element in position for back-flushing; and FIGURE 6 is a sectional view taken along line 6—6 of FIGURE 4.

Filter case 10 is shown in FIGURES 1 and 2 installed in flow line 11. Mounted in the filter case to filter the fluid flowing through flow line 11 is replaceable filter element 12. The filter element shown is of the wire mesh type. The element is cylindrical, having an inner perforated tubular mandrel 13 around which wire mesh 14 is located. Cap 15 closes one end of mandrel 13. Attached to the other end is end fitting or connection 18, which has an opening connected to the interior of the mandrel.

Filter case 10 includes fluid inlet member 16 and fluid outlet member 17. In the embodiment shown, the members are disc-shaped and have central opening 16a and 17a, respectively. Opening 16a provides an inlet to the filter case for the fluid traveling through flow line 11. Opening 17a provides an outlet for the fluid. In the embodiment shown, these openings are provided with pipe threads to connect the inlet and outlet members into line 11.

Means are provided to hold the inlet and outlet members in fixed, spaced, relationship and to provide a laterally-opening slot through which filter element 12 can be inserted into position between the members and removed therefrom. In the embodiment shown, two spacer bars 20 and 21 are provided for this purpose. The spacer bars extend between the members and their ends are attached to the members in any convenient manner. In the embodiment shown, the ends of the bars are welded to the members.

The spacer bars hold disc-shaped members 16 and 17 in spaced, parallel relationship with the inlet and outlet through the members in axial alignment. The two bars are located on opposite sides of the longitudinal axis of the inlet and outlet and they are sufficiently narrow to provide two laterally-opening slots 22 and 23, as shown in FIGURE 3. Either slot is large enough to permit the passage of filter element 12 into and out of the filter case. One such slot would probably be sufficient. It has been found, however, that with two slots the removal and installation of the filter element is much simpler, probably because it allows the filter element to be handled with two hands.

Means are provided for releasably mounting filter element 12 between inlet member 16 and outlet member 17. In the embodiment shown, in FIGURES 1–3, tubular adapters 26 and 27 are integrally connected to members 16 and 17, respectively, in axial alignment with the inlet and outlet openings through the members. Each adapter is designed to extend into the opening in connection 18 of the filter element. O-ring seal 28, located in an internal groove in the opening of connection 18, sealingly engages the outside surface of the adapters. When the filter element is positioned as shown in FIGURE 1, adapter 27 connects outlet 17a with the interior of filter element 12 so that fluid flowing into the filter case through inlet 16a will flow from the exterior to the interior of the filter element and then out of the filter element through outlet 17a. Adapter 27 also at least partially, supports the filter element in the filter case.

Resilient means comprising coil spring 30 and cap 31 are provided to releasably hold filter element 12 on adapter 27. Coil spring 30 is designed to fit over the adapters, such as adapter 26 connected to inlet member 16, and exert a resilient force against cap 31, which is in engagement with filter element 12. To remove the filter element, it is only necessary to move the filter element longitudinally toward the inlet, compressing spring 30 far enough to permit connection 18 to clear the end of adapter 27. The filter can then be moved laterally out of the filter case through either slot 22 or 23. A new filter can be installed by compressing spring 30 far enough to permit the filter to be positioned in axial alignment with adapter 27 for axial movement into the position shown in FIGURE 1.

Confining the fluid within the filter case is sleeve 34. The sleeve extends between inlet member 16 and outlet member 17 and encloses the space therebetween, including spacer bars 20 and 21. Sleeve 34 is in sliding, sealing engagement with the inlet and outlet members, i.e., seal rings 43 and 44 located in grooves in the outside surface of discs 16 and 17. This allows the sleeve to be moved longitudinally in either direction relative to the members to open up lateral slots 22 and 23 that permit a filter element to be removed from the case and another installed. After the filter element has been changed, the sleeve is simply slid back into the position shown in FIGURE 1 and the flow line can be placed back into service.

FIGURE 2 shows the filter case with a filter element mounted for back-flushing. This is the reason that inlet disc 16 is provided with adapter 26. To back-flush a filter element, it is removed from the filter case after the sleeve has been moved longitudinally in one direction or the other far enough to permit this. It is turned around and reinstalled so that its open end is in sealing engagement with adapter 26, as shown in FIGURE 2. Coil spring 30 and cap 31 then are positioned with the spring in engagement with the filter element and cap 31 closing outlet 27. Cap 31 accomplishes this by having a cavity 37 into which adapted 27 extends an internal O-ring which sealingly engages the outside surface of the adapter. With the outlet closed by the cap and the filter element positioned as shown, fluid can be introduced through the inlet of the filter case and it will back-flush filter element 12 and clean it so it can be reused.

An opening must be provided for the back-flushing fluid so that it can be discharged from the filter case. Such an opening could be provided simply by sliding sleeve 34 back to open up the filter case. In the embodiment shown, however, sleeve 34 is provided with lateral opening 40, which is closed by the removable plug 41. By removing plug 41 during the back-flushing operation, an opening for the back-flushing fluid is provided. If desired, a line can be connected to opening 40, since it is tapped, to carry the back-flushing fluid away from the area or lead it into a receptacle, where it can be collected. After the filter element has been back-flushed sufficiently to clean it, it is removed from the case, turned around, and reinstalled in the case in the position shown in FIGURE 1. The sleeve is then slid back into position to close off the space between the end members and the line can be placed back into service.

The embodiment shown in FIGURES 4, 5, and 6 differs from the embodiment just described in only one respect. In this embodiment, the filter element is held on the adapter in a different way. Otherwise, the two embodiments are identical, so the same numbers will be used to identify the same parts in both embodiments.

In the embodiment shown in FIGURES 4, 5, and 6, instead of coil spring 30, mounting pin 50 holds filter element 12 on either adapter 26 or 27, as the case may be. In FIGURE 4 the pin holds the filter element on adapter 27 for filtering fluid flowing between the inlet and outlet of the filter case. The pin extends transverse the longitudinal axis of the filter case with its ends positioned in holes 51 and 52 in spacer arms 20 and 21, respectively. The pin is long enough to engage the holes, but not so long as to prevent sleeve 34 from being moved longitudinally past its ends. In place, the sleeve will hold the pin in the holes.

To remove the filter element, the sleeve is moved longitudinally far enough in either direction to clear the pin and the filter. The pin is removed by moving it axially through either hole 51 or 52. The filter element is then free to be removed. The element is replaced by reversing the above steps.

For back-flushing, the filter element is positioned as shown in FIGURE 5. Spacer arms 20 and 21 have a second set of aligned holes 53 and 54 positioned to locate pin 50 to hold filter element 12 on adapter 26. The outlet is closed by cap 31 and the filter is backwashed by fluid entering the filter through inlet 11.

Back-flushing fluid may escape through tapped hole 40 by removing plug 41. Cap 31 is shown being used to close the outlet for back-flushing. Since the cap serves no other purpose in this embodiment, a valve in line 11, downstream of the filter case, may be more convenient.

Thus, no threaded connections need to be broken and no wrenches are required to change a filter element with the filter case of this invention or to back-flush one. All that is necessary is to slide the sleeve in either direction that is convenient, remove the filter element as described above, install a new one, slide the sleeve back into position, and the flow line is back in service. This, of course, can be done with a minimum amount of downtime. Further, since no threaded connections are disturbed, there is much less chance of them beginning to leak. Also, with the filter case of this invention, changing the filter element imposes no torsional or bending stresses in flow line 11.

From the foregoing it can be seen that this invention is one well adapated to attain all the ends and objectives hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An in-line filter case for installation in a flow line for releasably mounting a filter to filter the fluid flowing through the line, comprising a fluid inlet member having an inlet for fluid to enter the filter case and a fluid outlet member having an outlet for fluid in the filter case, both members being adapted to be connected into a flow line with the inlet member upstream of the outlet member, means, extending between and attached to the members, holding the members in fixed spaced relationship and providing a laterally-opening slot through which a filter can be inserted into position between the members and removed therefrom, means releasably mounting a filter between the inlet and outlet members to filter fluid flowing between the inlet and the outlet, and a sleeve in sliding sealing engagement with the members enclosing the space between the members, including the spacing means, to confine fluid flowing from the inlet to the outlet and movable longitudinally in either direction relative to the members to permit a filter to be removed from between the inlet and outlet members or installed therebetween through the slot in the spacing means without disconnecting the members from the flow line or the spacing means from the members.

2. The filter case of claim 1 in which the mounting means for the filter includes an adapter for extending into and for connecting the interior of a filter with the outlet to at least partially support the filter and to cause the fluid flowing through the filter case to flow from the exterior of the filter into the interior thereof and then out of the filter case through the outlet.

3. The filter case of claim 2 in which the filter mounting means comprises a coil spring located between the inlet member and the filter to resiliently hold the filter in position on the adapter.

4. The filter case of claim 2 in which the means for holding the inlet and outlet members in fixed spaced relationship includes two parallel spacer bars extending between the members with their ends rigidly connected to the members and the filter mounting means includes a pin extending between the spacer bars and located to hold a filter in position on the adapter, said spacer bars having axially aligned holes into which the ends of the pin extend to permit the pin to be removed by axial movement through one of the holes to release the filter when the sleeve has been moved longitudinally far enough to clear the pin.

5. The filter case of claim 2 further provided with additional outlet means not connected to the flow line in which the filter case is installed, means for closing the outlet in the outlet member, and means for mounting a filter with its interior connected directly to the inlet in the inlet member to back-flush the filter by permitting fluid to flow through the inlet in the inlet member into the interior of such filter, through the filter to the exterior thereof and out of the filter case through the additional outlet means thereby washing any material collected on the exterior of the filter from the filter and out of the filter case.

6. A filter case for installation in a flow line to releasably mount a filter to filter the fluid flowing through the line, comprising an inlet disc and an outlet disc, each disc having an opening therethrough for connecting to a flow line to provide an inlet and an outlet, respectively, through which fluid can enter and leave the filter case, means for holding the discs in fixed, spaced, parallel relationship with their openings in axial alignment including two parallel spacer bars extending between the discs with their ends rigidly connected to the discs, said spacer bars being oppositely disposed relative to the longitudinal axis of the inlet and outlet openings in the discs, and sufficiently narrow to provide a laterally-opening slot through which a filter can be inserted into position between the discs to filter fluid flowing through the case, means for releasably mounting a filter between the discs, and a sleeve extending between and encircling a portion of the outside surface of both discs to enclose the space between the discs including the spacer bars to confine the fluid flowing into the filter case through the inlet, said sleeve being in sliding sealing engagement with the discs and movable longitudinally relative to the discs to open the slot between the spacer bars sufficiently to permit a filter to be removed from between the discs or positioned therebetween without disconnecting the discs from the line or the spacer bars from the discs.

7. The filter case of claim 6 in which the mounting means for a filter includes a tubular adapter mounted on the outlet disc in axial alignment with the outlet opening to extend into the open end of the central opening of a filter to partially support the filter and to connect the interior of the filter to the outlet whereby fluid flowing into the case through the inlet will pass through the filter from the outside thereof to the inside and then out of the case through the outlet.

8. The filter case of claim 7 in which the mounting means includes a spring and a cap for closing the outlet, and the inlet disc is provided with an adapter to connect the interior of a filter to the inlet while the spring means hold such filter in engagement with the adapter and the cap closes the outlet to permit such filter to be cleaned by back-flushing fluid through it.

9. The filter case of claim 7 in which the mounting means further includes a mounting pin extending transverse the longitudinal axis of the openings in the inlet and outlet discs to engage a filter and hold the filter in position on the adapter mounted on the outlet disc, said spacer bars having axially aligned holes into which the ends of the pin are positioned to hold the pin in position to so hold the filter and to permit the pin to be removed from its holding position by moving the pin axially through one of the holes when the sleeve has been moved far enough to clear the pin.

10. The filter case of claim 9 in which the inlet disc is provided with an adapter to connect the interior of a filter to the inlet and in which the spacer arms are provided with axially aligned holes into which the mounting pin can be positioned to hold the filter on the inlet disc adapter to permit such filter to be cleaned by back-flushing fluid through it.

References Cited

UNITED STATES PATENTS

| | | | |
|---|---|---|---|
| 1,007,449 | 10/1911 | Keyes | 210—442 |
| 2,773,602 | 12/1956 | Sylvester | 210—442 X |
| 3,300,050 | 1/1967 | Peray | 210—457 X |
| 3,369,665 | 2/1968 | Paulson | 210—448 X |

REUBEN FRIEDMAN, *Primary Examiner.*

J. ADEE, *Assistant Examiner.*

U.S. Cl. X.R.

210—411, 447, 451